Dec. 4, 1923.
A. L. GALUSHA
1,476,292
GAS PURIFYING APPARATUS
Filed May 24, 1919     2 Sheets-Sheet 2
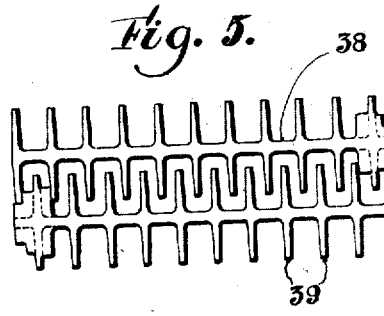
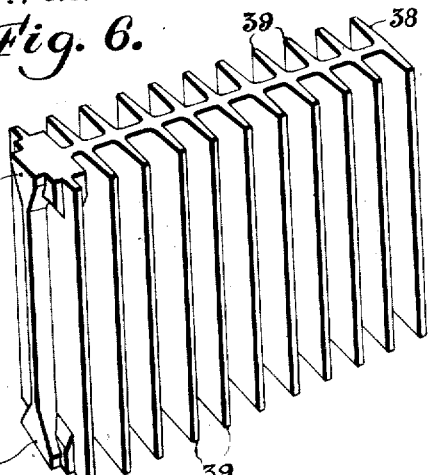
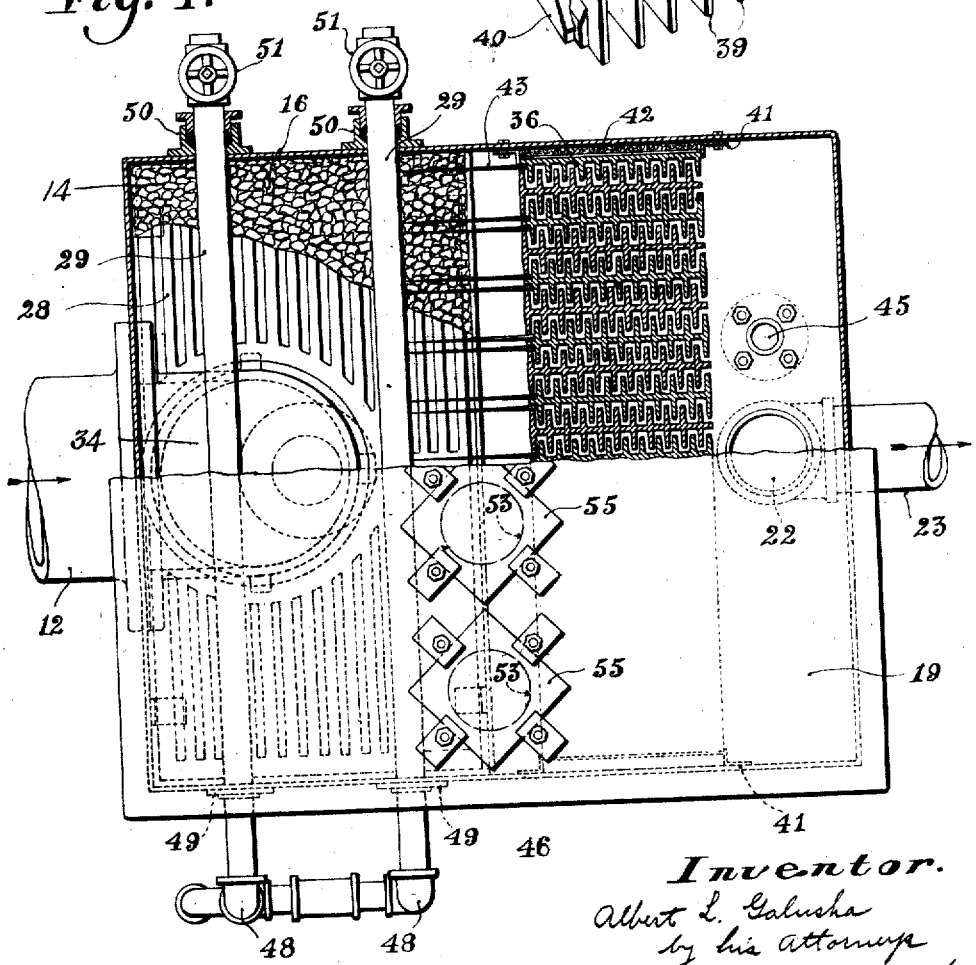
Inventor.
Albert L. Galusha
by his attorneys
Van Ernen, Fish & Hildreth Patented Dec. 4, 1923.

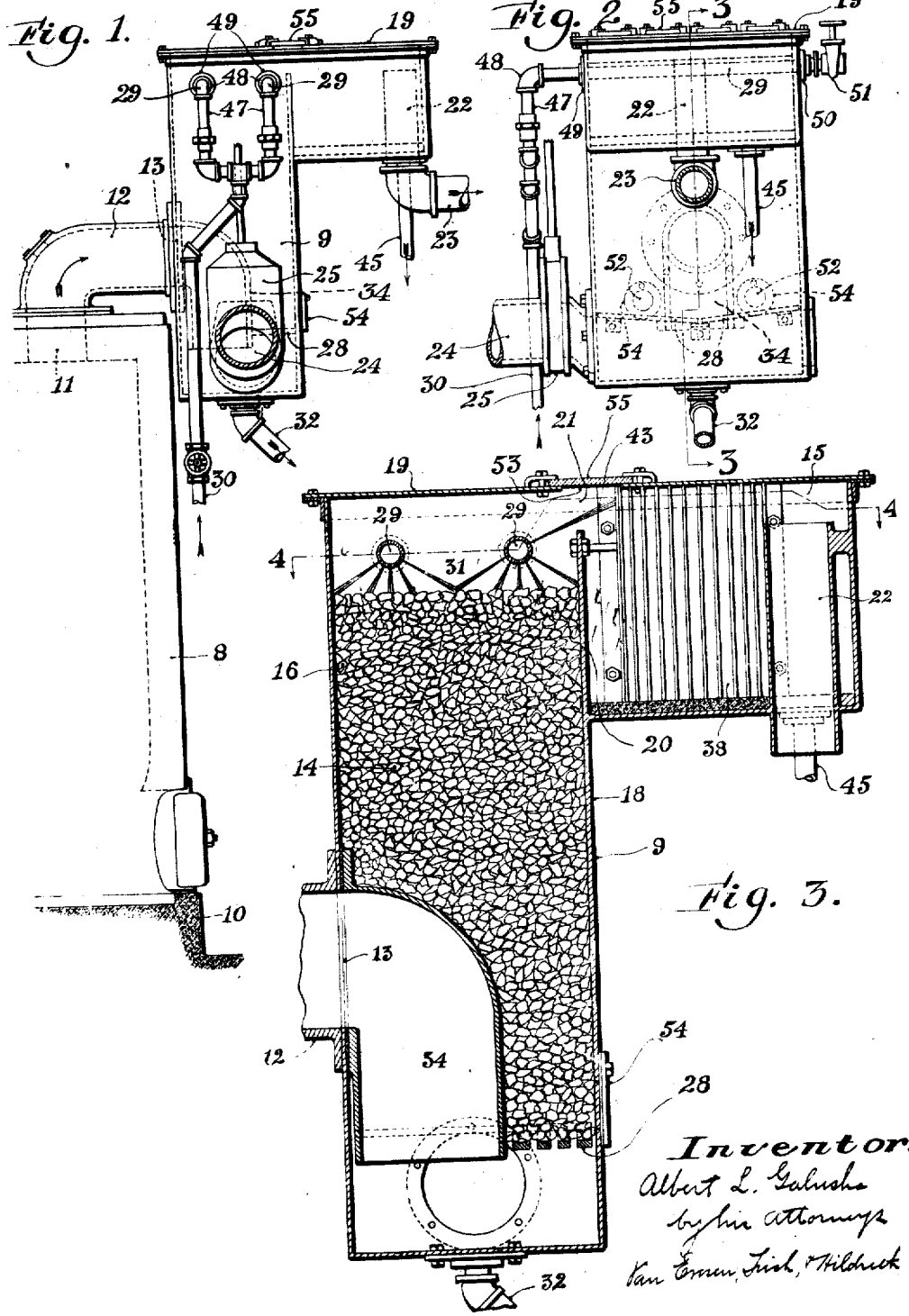
Dec. 4, 1923.
A. L. GALUSHA
GAS PURIFYING APPARATUS
Filed May 24, 1919
1,476,292
2 Sheets-Sheet 1

1,476,292

UNITED STATES PATENT OFFICE.

ALBERT L. GALUSHA, OF SHARON, MASSACHUSETTS.

GAS-PURIFYING APPARATUS.

Application filed May 24, 1919. Serial No. 299,457.

*To all whom it may concern:*

Be it known that I, ALBERT L. GALUSHA, a citizen of the United States, residing at Sharon, in the county of Norfolk and State of Massachusetts, have invented certain new and useful Improvements in Gas-Purifying Apparatus; and I do hereby declare the following to be a full, clear, and exact description of the invention, such as will enable others skilled in the art to which it appertains to make and use the same.

This invention relates to gas producer plants and more particularly to a gas purifying apparatus or scrubber for use in connection with such plants to effect the cooling, cleaning and drying of the gas generated thereby.

One of the objects of the invention is to improve the construction and mode of operation of gas purifying devices to adapt them to furnish perfectly clean gas suitable for use in an internal combustion engine.

Another object of the invention is to provide means for effecting a substantial reduction in the temperature of the gas as close as possible to the producer to void any long lengths of heated pipes and the liability of burning of the gas and resulting impairment in quality due to inward leaking of air at the various connections or valves, as in prior constructions.

Another object of the invention is to produce an effective and reliable gas purifying apparatus, of simple and practical construction, which is greatly reduced in size and weight from those heretofore used.

A further object of the invention is to provide, in a gas purifying device, an improved compact and effective means for drying the gas after it has been cleaned and before it leaves said device.

A still further object of the invention is to provide a gas purifying apparatus which will perform its functions equally well whether it is maintained in a level position or is tilted to one side or the other, as for example, when installed on a ship or boat.

To the accomplishment of the objects of the invention above referred to and such others which may hereinafter appear, the invention comprises the features and combinations of parts hereinafter described and claimed, the advantages of which will be apparent to those skilled in the art.

The preferred form of the invention is illustrated in the accompanying drawings in which:—Figure 1 is a view in side elevation, illustrating the application to a gas producer of a gas purifying apparatus embodying the present invention; Fig. 2 is a view in end elevation of the gas purifying apparatus, looking from the right in Fig. 1; Fig. 3 is a sectional view thereof on an enlarged scale taken on the line 3—3 of Fig. 2, looking in the direction of the arrows; Fig. 4 is a view partly in plan and partly in section on the line 4—4 of Fig. 3, and on a still further enlarged scale; Fig. 5 is a detail plan view of two of the baffle plates employed in the apparatus, illustrating the manner in which they are assembled; and Fig. 6 is a perspective view of one of the baffle plates.

In Fig. 1 of the drawings a gas producing and purifying plant is illustrated, comprising a gas producer or generator 8 and a purifying apparatus 9, through which the gas passes from the producer to the point of use. The producer 8 is suitably supported upon a foundation 10 and is provided with a gas outlet 11 at the top thereof. The purifying device 9 is mounted upon the producer in close proximity to the outlet 11, being secured to the outwardly turned end of a hollow elbow 12 which projects from the top of the producer and connects the outlet 11 thereof with an opening 13 at one side of the purifier.

The purifying apparatus comprises, in general, a scrubber or primary cleaning chamber 14, which receives the gas directly from the producer, and a secondary chamber 15, containing purifying and drying devices through which the gas passes after leaving the scrubber. The scrubber chamber 14 is filled with baffle material 16, such as broken stone, over which is maintained a constant flow of cold water and the gas is cooled and cleaned as it passes slowly therethrough. In the secondary chamber 15 the gas flows at relatively high velocity through a plurality of restricted tortuous passages, wherein first it is further cleansed and later, before the gas leaves the passages, the moisture entrained therein is thoroughly removed. Thus the gas finally drawn off from the apparatus is cool and perfectly clean and dry.

The various parts of the purifying apparatus are all assembled within a single shell or casing 18 of rectangular, inverted L-shape, which is provided with a removable top plate 19. The primary or scrubbing chamber 14 is enclosed by a vertically disposed portion of the casing 18 which is secured to the elbow 12, while the secondary chamber 15 extends laterally from the wall of the scrubbing chamber at the top thereof. The two chambers are separated by a partition wall 20, extending part way from the bottom of the chamber 15 to the top plate 19, leaving an opening 21 through which the gas enters said chamber. The purified gas leaves the secondary chamber 15 through the open upper end of the vertical conduit 22, which is formed integrally with the casing 18, rising to the upper portion of the chamber 15 and extending below the bottom thereof sufficiently for connection to a delivery pipe 23 which conveys the gas to the engine or other gas consuming element. In order to permit the escape of the products of combustion in case the engine is shut down, a vent pipe 24 is provided at the bottom of the primary chamber 14 through which the gas may be diverted before passing through the scrubber and discharged directly into the air. Normally the vent pipe 24 is closed by means of a suitable valve 25 which is located close to the purifier casing 18.

In the scrubbing chamber 14 the baffle material 16, which consists of crushed stone or other broken and fire proof substance, is supported upon a grate 28 which is located near the bottom of the chamber and so constructed as to permit the passage therethrough of the gas but not of the baffle material. The constant flow of cool water is maintained throughout the mass of baffle material by means of the sprinkler pipes 29 which branch from a main water supply pipe 30 and extend horizontally through the upper part of the chamber 14. Inasmuch as the passage 14 is rectangular in cross section, an absolutely uniform water distribution may be obtained by the use of ordinary straight sprinkler pipes. The openings in the sprinkler pipes are so arranged that the water will be sprayed evenly over the surface of the baffle material, as indicated at 31 in Fig. 3, and percolates downwardly through the mass. A drain pipe 32 leads from the bottom of the chamber 14 to carry away the waste water.

The gas from the producer consists largely of carbon monoxide as a result of the burning of the fuel with a limited air supply, and consequently it will become ignited if it is allowed, while still hot, to come into contact with the air. The gas is, of course, received from the producer at a high degree of temperature and inasmuch as air is liable to leak into the primary chamber of the purifying apparatus as, for example, around the vent pipe 24 or its valve 25, there is danger that the gas may become ignited in said chamber.

In order to prevent possible loss of gas by burning and the resulting reduction in quality of the unburned gas, provision is made for cooling the gas before it is discharged into the primary chamber of the purifying apparatus. To this end the opening 13 in the side wall thereof is located a considerable distance above the grate which supports the baffle material and a conduit 34 is provided to convey the gas, received through said opening, to a point below the grate. This conduit 34 forms an extension of the passage within the elbow 11 and is surrounded by the continuously cold baffle material and descending water so that said conduit constitutes a cooling chamber in which the incoming gas is materially cooled to such an extent that its temperature is reduced below the ignition point before it is discharged into the bottom of the scrubbing chamber 14. Inasmuch as the vent pipe valve is located beyond the cooling chamber, and the temperature of the gas is reduced below the ignition point before it is discharged into the scrubbing chamber, any inward leakage of air which may possibly occur at the vent pipe will not cause ignition and deterioration in quality of the gas and consequently will not be objectionable. Furthermore there will be no tendency for the vent pipe valve to become warped or damaged by hot gas as is liable to be the case where said valve is located in the pipe which receives the hot gas directly from the producer.

The gas passes from the bottom of the primary chamber 14 through the grate 28 and rises through the crushed baffle material 16, the effective cross-sectional area of the chamber being relatively large so that the gas moves at low velocity in passing from the bottom to the top thereof. During this slow upward movement of the gas, it is still further cooled and also is cleansed by the passage through the gas of the water in more or less finely divided streams or drops. The water not only absorbs the soluble material contained in the gas, but removes or washes out a large percentage of the solid impurities such as soot and small particles of dust.

After being subjected to the above described scrubbing process in the primary chamber 14, the partially purified gas passes into the secondary chamber 15, through the opening 21, and flows through the tortuous passages formed therein, which are indicated at 36 in Fig. 4, wherein the extremely fine particles of dust which escape from the scrubber are taken out. The passages 36 together have a cross-sectional area which is considerably less than the area of the inlet 21 of the chamber 15, and very much less than the effective cross-sectional area of the primary chamber 14, so that they provide a restricted outlet for the gas, which consequently flows through the passages at relatively high velocity as compared with its movement through the scrubber 14. The passages 36 are formed, throughout their length, with many successive 180° turns which reverse the direction of flow of the gas. The walls of the passages, near the entrance ends, are kept wet with water which enters the passages at the top and flows downwardly in thin films over the walls thereof. By reason of the relatively high velocity of gas and the repeated abrupt changes in its direction of flow, all the solid particles remaining therein are projected with force against the walls of the passages and into the film of water which holds them and carries them down the walls and finally away through the drain pipe. The latter portions of the tortuous passages, the walls of which do not receive any water, serve to dry the gas, any particles of moisture carried thereby impinging against the walls and trickling down the same. By reason of the peculiar construction of the walls of the tortuous passages, the solid impurities in the gas are practically shot against said walls in a direction substantially perpendicular thereto, as the gas flows through said passages, thus insuring the entrapping of all such impurities by the film of water which envelopes the walls.

The tortuous passages 36 are formed between a plurality of grids or baffle plates 38, each comprising a central web from both sides of which project perpendicularly a plurality of ribs 39 that are equally spaced apart. The baffle plates 38 are set up side by side in the secondary chamber 15, with the ribs 39 vertically disposed, the ribs of one plate extending into the spaces between the ribs of the adjacent plate in such a manner that a conduit is provided, having tortuous passages of substantially uniform width, through which the gas may flow in a general horizontal direction.

In the construction shown, the grids or baffle plates 38 are cast symmetrically, so that when assembled they may be turned end for end alternately. In order that the baffle plates when turned end for end and assembled may be spaced apart the required distance, with the cooperating ribs properly alined, one end of each plate is formed with thickened portions or shoulders 40 at the top and bottom thereof, which are shaped as shown clearly in Figs. 5 and 6. By means of this construction a firm and rigid structure is assured when the grids are assembled and relative displacement is prevented. The side grids are cast with ribs and shoulders on one side only of the central web and the whole grid assembly is held in position in the chamber 15 by means of angle irons 41, backed by a layer of cement 42 as shown in Fig. 4.

In order that the walls of the passages 36 may be kept wet for a certain distance from the ends first encountered by the gas, a row of holes is provided in the side of the sprinkler pipe 29 nearer the chamber 15, through which holes water is sprayed upon the walls. A hole is arranged opposite the entrance to each passage and serves to direct a stream of water into the entrance thereof at the top, as shown at 43 in Figs. 3 and 4. The water penetrates far enough into the passages 36 so that an ample area of wet surface is provided to insure the complete removal of all the solid impurities from the gas. The rearward portions of the tortuous passages serve to dry the gas by collecting on their walls all the particles of moisture carried by the gas. The water which is sprayed into the inlet ends of the passages 36 from the sprinkler pipe, and the water which collects on the walls of the drying sections of the passages is led away from the bottom of the chamber 15 by means of the drain pipe 45.

By means of the herein described arrangement of tortuous passages, wherein the gas is forcibly directed against the wet walls thereof, the solid material contained in the gas is thrown into contact with the water, instead of the water being sprayed through the slowly moving gas, as in devices of this character heretofore generally used. Where water is merely sprayed through the gas which is to be cleaned, it does not come in contact with all of the dust and dirt contained therein and as a result the gas is not thoroughly purified. With the present construction however, all of the solid matter in the gas, by reason of its greater inertia, will be shot into the thin film of water which flows downwardly over the surfaces of the baffle plates 38, and even the extremely fine dust particles, such as invariably escape from the ordinary coke or baffle scrubbers, are removed.

In order that the sprinkler pipes 29 may be readily cleaned or replaced when they become clogged or rusted, the following provision is made: The pipes are connected with branches 47 of the main water supply pipe 30, by means of elbows 48, and are provided with flanges 49 which are welded or brazed onto the pipes between the elbows 48 and the adjacent side of the casing 18 and serve to close the openings through which the pipes enter the scrubbing chamber 14. At the opposite side of the casing 18 the sprinkler pipes extend through stuffing boxes 50 to the exterior of the casing where they are provided with hand controlled valves 51 which are normally kept closed. Almost all of the dirt and sediment in the water will collect near the extreme ends of the sprinkler pipes and may usually be removed by opening the valves 51 so that the sediment may be flushed out. If necessary a swab may be introduced into the open ends of the pipes and pushed back and forth through the pipes to clean out any material which sticks to the inside thereof. Usually, the cleaning can be accomplished quickly, by thus flushing or swabbing the pipes without interfering with the operation of the device or opening the casing 18 so as to permit outward leakage of gas or inward leakage of air. If, however, the spray holes in the sprinkler pipes have become so clogged that satisfactory cleaning cannot be effected in the manner described, the water can be shut off from the sprinkler pipes, and the pipes can be removed, one at a time, and clean ones put in their places. This may be accomplished by removing the valves 51 and disconnecting the sprinkler pipes from the elbows 48. The pipes may be thus removed without the necessity of shutting down the apparatus since the two openings left in the side of the scrubber casing by the removal of one of the pipes, are too small to permit the escape of any material amount of gas.

Convenient access to the interior of the casing 18 may be obtained through hand holes 52 (Fig. 2) in the casing 18, or through hand holes 53 in the top plate 19. The hand holes 52 are normally closed by covers 54, and the hand holes 53 are normally closed by covers 55, of plate glass, through which an attendant may watch the spraying of the water from the sprinkler pipes and ascertain whether the water is being properly distributed. When flushing or otherwise cleaning the sprinkler pipes the transparent covers 55 also permit the attendant to watch the progress of the cleaning operation. The entire top plate 19 may be removed, if desired, to afford access to portions of the interior of the device not readily reached from the hand holes.

Since the above described device furnishes cool and perfectly clean and dry gas, it is particularly adapted for supplying gas for use in internal combustion engines. Moreover, by reason of its reduced weight and compact arrangement it is especially fitted for installation upon trucks, cars, boats, or other portable outfits.

Certain features of the present apparatus particularly recommend it for use on a boat or ship. Purifying devices of ordinary construction which are installed on board a vessel fail to work properly when the vessel is listed, as for example, when running at an angle to a strong wind, because the cleansing water collects all at the lower side of the apparatus where it will not come in contact with the gas. In the present device, by means of the plurality of separate vertical cleaning or washing passages, each of which is provided with a continuous supply of water, such a collection of water at one side of the device is impossible when the apparatus is mounted with the baffle plates 38 extending lengthwise of the boat. Consequently no portion of the gas can pass through the apparatus without coming into contact with the water and being properly cooled and cleaned. Furthermore by means of the herein described provision for drying the gas, after it has been cleaned, the use of salt water in the scrubber is rendered feasible, inasmuch as all the salt and water is removed in the dryer, before the gas reaches the engine.

It will be seen that a purifying device has been produced which is of a much smaller size than those which are ordinarily employed, and also that by mounting the device high up, at one side of the producer, no separate foundation or supports are required and a considerable saving of floor space is effected. It will be readily appreciated that these features are of particular importance when the apparatus is installed on a ship, vehicle or portable device. Another advantage results from the improved construction and compact arrangement of the present purifying apparatus, permitting it to be mounted closely adjacent the outlet of the producer, thereby avoiding the presence of long lengths of heated gas pipes between the producer and the purifying apparatus. It will be seen that the purifying apparatus is mounted in such a way that it is permitted to extend below the top of the generator. Such an arrangement enables the apparatus to be installed in low studded rooms or compartments such as are found on shipboard.

It will also be apparent that the present apparatus contains no pockets or crevices in which water or acids may collect and remain when the device is not in use, but the arrangement of the parts is such that all of the water will immediately be carried away as soon as the supply is shut off. Consequently, there is no danger of injury resulting to the apparatus by freezing of the water when the device is idle or corrosion of parts of the device by acids contained in the water.

While the drawings illustrate the baffle plates 38 as being arranged with their ribs disposed in vertical planes, thereby providing a series of tortuous passages through which the gas flows in a general horizontal direction, it is to be understood that the invention, except where so specified in the claims, is not limited to such an arrangement, but may be embodied in other and different arrangements without departing from the spirit of the invention. The details of construction may also be variously modified within the limits defined by the claims without departing from the invention.

The invention having been described, what is claimed is:—

1. A gas purifying apparatus having, in combination, a cooling device into which the hot gas passes, a delivery pipe for the cooled gas, and a vent pipe between the cooling device and the delivery pipe through which the gas may be discharged directly into the air.

2. A gas purifying apparatus having, in combination a scrubber for cleaning the gas, a cooling device located within the scrubber, a vent pipe through which the cooled gas may be discharged from the scrubber directly into the air before being cleaned, and means for controlling the passage of gas through the vent pipe.

3. A gas purifying apparatus having, in combination, a combined cleaning and drying device having a passage therein provided with a plurality of 180° turns in which the gas is first cleaned and thereafter dried as it passes therethrough, and means arranged to cause a flow of cleansing water over the walls of said passage at the entrance end thereof.

4. A gas purifying apparatus having, in combination, a primary chamber, a secondary chamber at one side thereof and separated therefrom by a partition having an opening at the top, a plurality of substantially vertical walls extending from the top to the bottom of the secondary chamber and forming a plurality of tortuous gas passages and means for supplying water to the primary chamber and through the opening between the chambers into the entrance ends only of the gas passages, the outlet ends of the passages serving as drying surfaces to extract moisture from the cleansed gas.

5. A baffle plate for a gas purifying device comprising a central web having a plurality of transverse deflecting ribs extending from opposite sides thereof the plate being adapted for assembly in parallelism with similar plates to provide tortuous passages for the gas.

6. A baffle plate for a gas purifying device comprising a central web having a plurality of transverse deflecting ribs extending therefrom, the plate being adapted for assembly in parallelism with a similar plate to provide a tortuous passage for the gas, and provided with integral means for positioning the adjacent plate with relation thereto.

7. A baffle plate for a gas purifying device comprising a central web having a plurality of transverse deflecting ribs extending therefrom, the plate being adapted for assembly in parallelism with a similar plate to provide a tortuous passage for the gas, and provided with spacing means adjacent one end to adapt the plate to be assembled only with alternate plates having their ends reversed.

8. A gas purifying apparatus having, in combination, a primary cleaning chamber, a secondary cleaning chamber at one side of and separated from the primary chamber by a partition having an opening at the top and means for supplying water to said chambers comprising a pipe extending through the top of the primary chamber being perforated to direct the water downwardly into the primary chamber and laterally into the secondary chamber.

9. A gas purifying apparatus comprising a cleaning chamber having means for supplying cleansing water thereto, and provided with a plurality of independent non-intercommunicating passages having laterally extending portions which receive the water and in which impurities are removed from the gas said passages insuring an even distribution of the water throughout the cleaning chamber in case it is tilted laterally.

10. A gas purifying apparatus having, in combination, a chamber provided with a gas inlet and a gas outlet at opposite ends thereof and having a plurality of tortuous non-intercommunicating passages for constantly reversing the direction of the flow of the gas from the inlet end of the chamber to the outlet end, the passages extending substantially vertical from the top to the bottom of the chamber, and means for supplying water to the walls of the passages at the top of the chamber and for draining away the water from the bottom of the chamber.

ALBERT L. GALUSHA.

Certificate of Correction.

It is hereby certified that in Letters Patent No. 1,476,292, granted December 4, 1923, upon the application of Albert L. Galusha, of Sharon, Massachusetts, for an improvement in "Gas-Purifying Apparatus," errors appear in the printed specification requiring correction as follows: Page 1, line 26, for the word " void " read *avoid;* page 2, line 95, after the word " pipe " insert the word *valve;* page 5, line 82, claim 8, after the word " chamber " insert the words *through the opening in the partition;* and that the said Letters Patent should be read with these corrections therein that the same may conform to the record of the case in the Patent Office.

Signed and sealed this 12th day of February, A. D., 1924.

[SEAL.]
                                                 KARL FENNING,
*Acting Commissioner of Patents.*